(12) United States Patent
Scott et al.

(10) Patent No.: US 7,017,863 B2
(45) Date of Patent: Mar. 28, 2006

(54) TURBULENT FLOW DRAG REDUCTION

(75) Inventors: Simon J Scott, Bristol (GB); Graham A Johnson, Bristol (GB); Edward Thornton, Tetbury (GB)

(73) Assignee: BAE SYSTEMS plc, London (GB)

(*) Notice: Subject to any disclaimer, the term of this patent is extended or adjusted under 35 U.S.C. 154(b) by 0 days.

(21) Appl. No.: 10/474,008

(22) PCT Filed: Mar. 26, 2002

(86) PCT No.: PCT/GB02/01444

§ 371 (c)(1),
(2), (4) Date: Oct. 9, 2003

(87) PCT Pub. No.: WO02/081303

PCT Pub. Date: Oct. 17, 2002

(65) Prior Publication Data

US 2004/0200932 A1  Oct. 14, 2004

(30) Foreign Application Priority Data

Apr. 6, 2001 (GB) ................................ 0108740

(51) Int. Cl.
*B64C 23/00* (2006.01)
(52) U.S. Cl. ...................................................... 244/205
(58) Field of Classification Search ................ 244/130, 244/204, 205; 422/186.04; 204/164
See application file for complete search history.

(56) References Cited

U.S. PATENT DOCUMENTS

| | | | | |
|---|---|---|---|---|
| 3,095,163 A | * | 6/1963 | Hill | 244/12.1 |
| 3,162,398 A | * | 12/1964 | Meyer et al. | 244/3.1 |
| 3,224,375 A | * | 12/1965 | Hoff | 244/158 A |
| 3,360,220 A | * | 12/1967 | Meyer | 244/205 |
| 5,320,309 A | | 6/1994 | Nosenchuck et al. | |
| 5,669,583 A | | 9/1997 | Roth | |
| 5,917,286 A | | 6/1999 | Scholl et al. | |
| 5,938,854 A | | 8/1999 | Roth | |
| 6,200,539 B1 | * | 3/2001 | Sherman et al. | 216/67 |
| 6,888,314 B1 | * | 5/2005 | Krichtafovitch et al. | 315/111.91 |

FOREIGN PATENT DOCUMENTS

| | | |
|---|---|---|
| GB | 94/00342 A1 | 1/1994 |
| WO | 1134446 | 11/1968 |

* cited by examiner

*Primary Examiner*—Tien Dinh
(74) *Attorney, Agent, or Firm*—Nixon & Vanderhye P.C.

(57) ABSTRACT

The present invention relates to apparatus for influencing fluid flow over a surface, and more particularly, but not exclusively, to turbulent boundary layer flow drag reduction for an aircraft. The present invention provides such apparatus including a plasma generator comprising first and second spaced-apart independently controllable electrodes operable to cause a change in direction of the flow of the fluid over the surface.

11 Claims, 3 Drawing Sheets

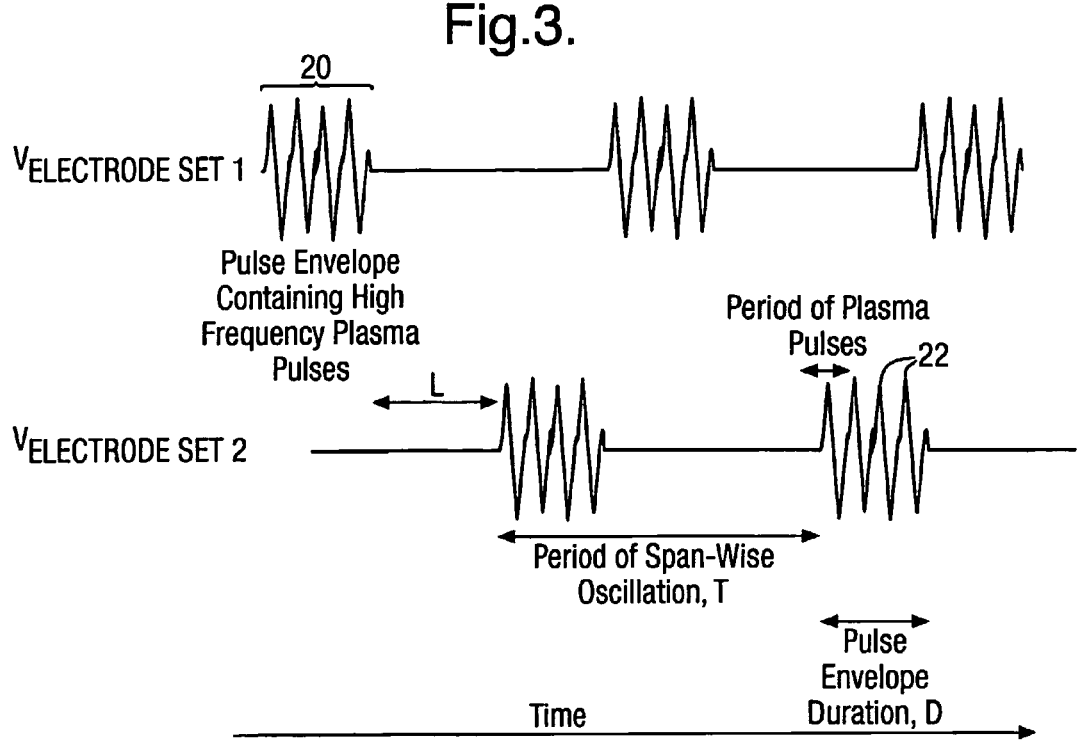
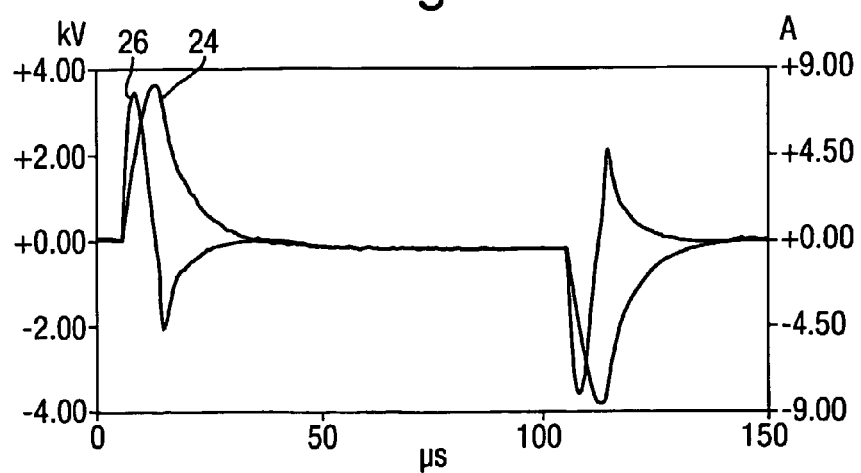

TURBULENT FLOW DRAG REDUCTION

This application is the US national phase of international application PCT/GB02/01444 filed 26 Mar. 2002, which designated the US. PCT/IB02/01444 claims priority of GB Application No. 0108740.2 filed 06 Apr. 2001. The entire contents of these applications are incorporated herein by reference.

BACKGROUND OF THE INVENTION

1. Field of the Invention

The present invention relates to apparatus for influencing fluid flow over a surface, and more particularly, but not exclusively, to turbulent boundary layer flow drag reduction for an aircraft.

2. Discussion of Prior Art

The boundary layer is a thin layer of fluid (air) that forms, for example, on an aircraft wing during flight adjacent to the surface of the wing in which viscous forces exert an influence on the motion of the fluid and in which the transition between still air and the wing's velocity occurs. Boundary layer control techniques are known where the airflow in the boundary layer is modified to increase and/or decrease drag.

Turbulent boundary layer flow is not yet fully understood, but the recognition that coherent structures exist has allowed efforts to be directed to modifying and/or controlling the turbulent boundary layer flow, as described, for example, in AIM paper 96-0001—"Control of Turbulence"—J. Lumley. Direct numerical simulation of the turbulent boundary layer flow, as described, for example in Phys. Fluids A 4 (8)—"Suppression of Turbulence in Wall-bounded Flows by High Frequency Spanwise Oscillations"—W. J. Jung, N. Mangiavacchi, R. Akhavan shows that disrupting the coherent structures could have a dramatic effect on the skin friction, reducing it by up to 40%. If this level could be achieved on an aircraft this would equate to a reduction in total drag of between 10% and 20% offering substantial savings in fuel and/or increases in range. Experimental verification of this numerical prediction has been achieved and published in AIM paper 97-1795 —"Turbulent Boundary Layer Control by means of Spanwise-wall Oscillation"—K-S. Choi, P. E. Roach, J-R. DeBisschop, and B. R. Clayton. In that paper the use of mechanical oscillation is described to demonstrate skin friction reductions of up to 45%. However, the paper does not suggest how a practical mechanical oscillation system could be implemented successfully.

Other approaches for actively disrupting the coherent structures, such as blowing, or using tiny micro-electromechanical actuators have been postulated, but no practical and effective means have been demonstrated. Passive modification of the coherent flow structures has also been attempted, for example, riblets and large eddy break-up devices. These approaches have achieved skin friction drag reductions, but at a much smaller level (less than 10% as opposed to 40%) and are therefore marginal in their overall benefits once extra cost and other penalties (such as increased weight) are considered.

There remains a need for a passive or active system that disrupts the coherent turbulent boundary layer structures to achieve large skin friction reductions, which is both practical and cost effective. In the 1998 conference publication AIM 36th Aerospaces Meeting, paper AIM 98-0328—"Boundary Layer Control with a One Atmosphere Uniform Glow Discharge Surface Plasma"—Reece-Roth, Sherman and Wilkinson, an electrode system based on rigid printed circuit board material is described and the interaction of surface plasmas with boundary layers related. The electrode system comprises a single set of a multiplicity of parallel conductive lines all electrically connected to one another. The plasma generating circuit is a high voltage radio frequency source operated at 3.0 kHz. The interaction of the surface plasmas with the airflow was said in this paper to be due to an electrostatic attractive force—termed paraelectric. At the end of the paper it is postulated that this sort of technology might be applicable to the generation of span-wise oscillations for turbulent drag reduction. No information on how this concept could be achieved was given.

Both travelling wave and span-wise oscillation boundary layer disturbances have been tried for drag reduction in sea water (using a combination of magnetic and electric field forces). Travelling waves have been found to be more effective, at least under certain conditions, as described in Science 288, 1230 (2000)—"Suppressing Wall Turbulence by Means of a Transverse Traveling Wave", Du and Karniadakis.

SUMMARY OF THE INVENTION

It is an object of the present invention to provide an arrangement for influencing fluid flow so that an object's drag can be reduced.

According to a first aspect of the present invention, there is provided apparatus for influencing fluid flow over a surface, the apparatus including a plasma generator that comprises a flexible-sheet dielectric that supports first and second electrodes on a first side thereof and that supports a third electrode on a second side thereof, the first and second sides being generally opposed, wherein: each of the first and second electrodes comprise a plurality of electrically-connected elongate elements arranged such that the elongate elements are interdigitated; the first and second electrodes are independently controllable and are operable to cause a change in direction of the flow of the fluid over the surface; and the plasma generator is operable to drive the first and second electrodes alternately.

Providing first and second independently controllable electrodes provides far greater flexibility of operation. For example, the plasma generator may be operable to cause the fluid to flow in alternate generally opposite directions along the surface. In this way, spanwise oscillations may be created. If these generally opposite directions are generally perpendicular to the principal direction of fluid flow over the surface (caused, for example, by movement of the surface through the fluid), this may tend to reduce drag. Driving the first and second electrodes alternately may cause plasma generation alternately at adjacent electrodes, which may cause oscillation of the fluid flow in the generally opposite directions along the surface.

Electrodes may be formed on surfaces of the dielectric layer or could be within the dielectric layer. Having the dielectric in the form of a flexible sheet is advantageous because it may be attached to curved surfaces such as an aircraft wing. The third electrode may be used as an electrical ground.

Advantageously, arranging the first and second electrodes such that the elongate elements are interdigitated allows adjacent elongate members to be of different electrodes.

The first and second electrodes may be in juxtaposed alignment and, optionally, the first and second electrodes may be in substantially parallel alignment. Advantageously, the first and second electrodes may extend generally parallel to the usual direction of motion of the surface in use.

The third electrode may be planar or it may comprise a plurality of electrically connected elongate elements. With the latter arrangement, it is advantageous for the elongate elements of the first, second and third electrodes to be in a substantially parallel juxtaposed alignment when viewed facing the first side of the dielectric. Preferably, the elongate elements of the first, second and third electrodes extend generally parallel to the usual direction of motion of the surface in use. Optionally, the elongate elements of the third electrodes are laterally offset from the elongate elements of the first and second electrodes.

The present invention also relates to an aircraft aerodynamic surface and an aircraft including apparatus as defined above, wherein the plasma generator is operable to cause a change in direction of the flow of the fluid over the surface.

According to a second aspect of the present invention, there is provided a method of influencing fluid flow over a surface substantially as hereinbefore described with reference to and/or substantially as illustrated in the accompanying drawings.

BRIEF DESCRIPTION OF THE DRAWINGS

For a better understanding of the present invention, embodiments will now be described, by way of example, with reference to the accompanying drawings, in which:

FIG. 3 shows the timing of the pulses applied to the electrodes;

FIG. 4 shows in more detail the waveform of the pulses applied to the electrodes.

DETAILED DISCUSSION OF EMBODIMENTS

Figure 1:
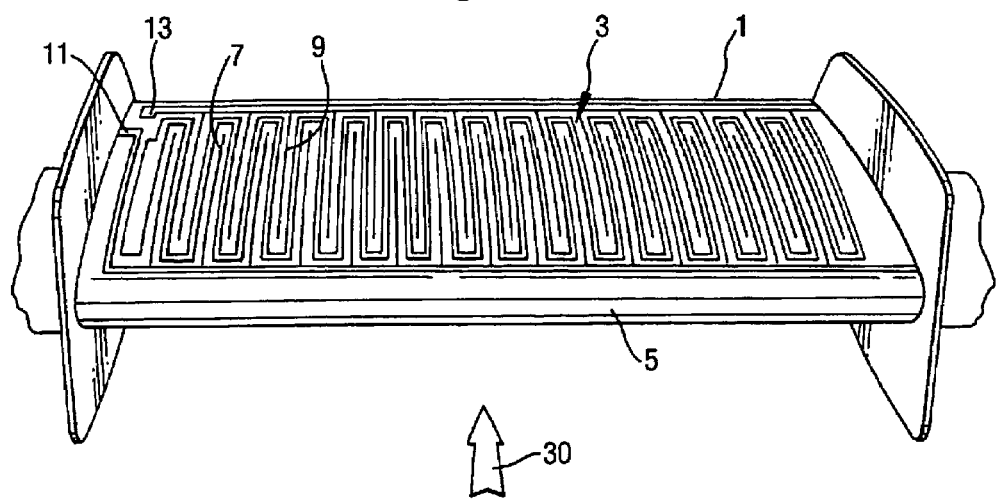
FIG. 1 shows an aircraft wing on which an electrode arrangement in accordance with the present invention is formed.

In the drawings, like elements are generally designated with the same reference numerals.

FIG. 1 shows a wing model 1 to which an electrode assembly 3 in accordance with the present invention is attached. The leading edge of the wing 1 is designated 5.

The electrode assembly 3 comprises first and second electrodes 7 and 9.

The electrodes 7 and 9 are similar in shape, and have a generally comb-like structure. Each electrode 7 and 9 comprises a plurality of parallel, vertically extending (in FIG. 1) fingers which are connected by a horizontal (in FIG. 1) strip. The fingers and the strip of each electrode 7 and 9 are integrally formed with one another. The first electrode 7 has a terminal 11 for connection to a power supply and second electrode 9 has a terminal 13 for connection to a power supply.

In the drawings only a limited number of electrode "fingers" are shown, for the sake of clarity. It will be understood that many more fingers would be employed in an electrode assembly for a commercial aircraft.

Figure 2:
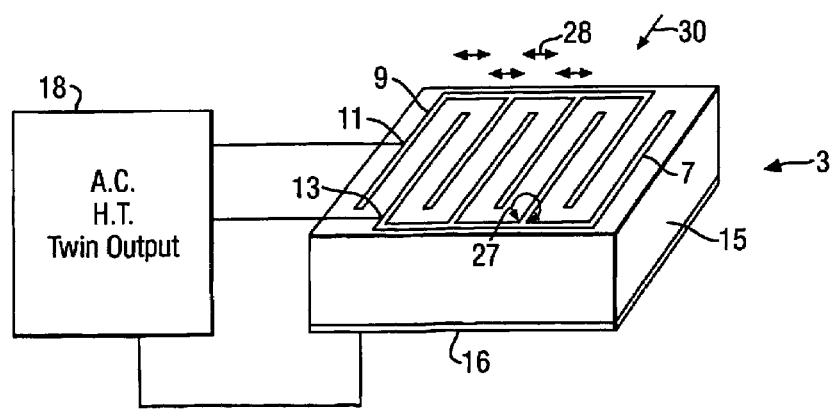
FIG. 2 is a schematic diagram of the apparatus for generating a plasma with a planar third electrode.

The first 7 and second 9 electrodes are interdigitated. As shown in FIG. 2, the electrodes 7 and 9 are formed on a sheet 15 of dielectric material, such as a polyester sheet which, in the embodiment, is 250 μm thick. A third, planar sheet electrode 16 is formed on the opposite side of the dielectric layer 15 to the first and second electrodes 7 and 9. The first, second and third electrodes 7, 9 and 16 are formed from copper and are 17 μm thick. The first and second electrodes 7 and 9 are formed by a conventional etching process. The fingers of each of the first and second electrodes 7 and 9 are between 200 μm and 500 μm wide, with each finger being spaced apart from its adjacent finger by 4 mm (adjacent fingers will be of different electrodes).

The first, second and third electrodes 7, 9 and 16 are driven by alternating current high-tension power supply 18.

The electrode assembly 3, comprising the three electrodes 7, 9 and 16 and the dielectric layer 15, is formed as a flexible sheet. The electrode assembly 3 can be adhered to a surface where it is required, such as an aircraft wing or fuselage. The flexibility of the sheet allows the electrode assembly 3 to be attached to curved surfaces, and the electrode assembly 3 is retro-fittable to existing aircraft with minimal structural disruption.

If the aircraft wing, or the structure to which the electrode assembly 3 is attached, is of metal or other electrically conductive material, the third electrode 16 may not be formed, and the conductive structure may be used to provide the function of that electrode by connecting the conductive structure to the power supply 18.

The power supply 18 is configured to alternately drive at the desired span-wise oscillation frequency first electrode 7 and second electrode 9.

FIG. 3 shows the duration and timing of the electrical pulses applied to terminals 11 and 13 of the first 7 and second 9 electrodes respectively. The upper oscillation current pulses shown in the Figure are applied to first electrode 7 and the lower oscillation current pulses are applied to second electrode 9. As can be seen, a pulse is never applied to the first 7 and second 9 electrodes at the same time. Each pulse envelope 20 comprises a plurality of shorter duration plasma pulses 22.

The signals have a pulse envelope repetition period T, determining the span-wise oscillation frequency. The Jung paper "Suppression of Turbulence in Wall-bounded Flows by High Frequency Spanwise Oscillation" referred to above describes how to select a span-wise oscillation frequency range that will reduce drag. Periods of oscillation $T^+_{osc}$ ranging from 25 to 200 were studied, where $$T^+_{osc} = T_{osc} U_\tau^2 / \nu$$

$T_{osc}$ being the oscillation period of the wall $U_\tau$ being the wall friction velocity $\nu$ being kinematic viscosity.

It was found that $T^+_{osc}=100$ produced the most effective suppression of turbulence.

Within each pulse envelope 20 of the signal is a train of high repetition-rate pulses 22, for example 10 to 100 pulses. FIG. 4 shows in more detail the voltage waveform 24 and the current waveform 26 of one pulse 22. The number of pulses 22 within each pulse envelope 20 and the energy of these pulses can be varied to allow adjustment of the impulse imparted to the air in the boundary layer. Generally, the greater the number and the energy of the pulses 20, the greater the effect on the boundary air. However, increasing the number of pulses, and the energy of each pulse will result in increased power consumption. Since, when implemented on an aircraft wing, the device is intended to allow a reduction in fuel consumption of the aircraft engines, there will be no overall saving in energy consumption if the power consumed by the plasma generating apparatus equals the energy saved by the reduction in drag. The energy applied to the pulse generating apparatus should be chosen to reduce the overall energy consumption of the aircraft in flight.

The duration D of the pulse envelope and the pulse envelope repetition period T can be independently adjusted.

Plasma is initiated by the high electric field at the first 7 and second 9 electrode/dielectric 15/air triple point 27, and then spreads out, capacitively coupled, to the third, planar electrode 16 on the opposite side of the dielectric layer 15 to the first and second electrodes 7 and 9. The electrode assembly 3 has an inherent capacitance, and additional capacitance when the plasma is formed.

The plasma generates span-wise impulses 28 in the boundary layer at the span-wise oscillation frequency. The impulses 28 are created by the plasma heating and causing expansion of the air in the boundary layer adjacent to the first 7 and second 9 electrodes. The impulses 28 move in a span-wise direction, which is generally perpendicular to the direction 30 of the primary airflow over the aircraft wing 1. It is considered by the present inventors that generating impulses generally perpendicular (within ±10°) to the principal direction 30 of airflow reduces drag.

Airflow is generated in a span-wise oscillating fashion because adjacent electrodes 7 and 9 are alternatively driven. When the first electrode 7 is driven, as mentioned above, the application of power to the electrode causes the heating and expansion of the air adjacent to the electrode 7. The expanding air will radiate from the electrodes, with components of the expanding air moving in opposite span-wise directions. During the period L when no pulses are applied to any of the electrodes the fluid will continue to flow. When the second electrode 9 is driven the air adjacent to this electrode 9 will also be heated and expand. This expansion will serve to reverse the span-wise movement of the air caused by the previous pulse supplied to the first electrode 7. The repeated alternate application of pulses to the electrode 7 and 9 therefore causes span-wise oscillation of air adjacent to electrodes 7 and 9 on the wing 1 surface. A suitable oscillation frequency range is thought to be between $10^4$ and $10^5$ Hz. The value will be chosen according to the location of the electrode assembly 3 on the aircraft and the speed of the aircraft.

In the embodiment the plasma spreads out approximately 4 mm on either side of each of the electrode fingers when a peak voltage of approximately 4 kV is applied.

The power supply 18 may generate a semiconductor switched current pulse which is already at a sufficiently high voltage for plasma generation, or, if not, the pulse is fired into a step-up transformer. For non-resonant charging of the electrode assembly 3 the output can be taken through a charging resistor. Resonant charging can also be used from a supply with no charging resistor. Current flows and when a plasma generation threshold is exceeded, plasma is generated thereby dissipating power. In the present embodiment, when a sheet 15 of 250 µm thick polyester is used for the dielectric material, the plasma generation threshold will be approximately 2 kV. Integrating the voltage and current waveforms shows the energy balance—this rises as the structure charges and then drops as it discharges but not by as much as it rose, the difference is the energy dissipated in the plasma. Multiplying by the plasma pulse repetition rate and the duty cycle gives the average power dissipation. Dividing by the electrode sheet surface area gives the power per unit area. This is an important factor—in order for drag reduction to be efficient, the power per unit area must be less than the power drag reduction of the skin friction. Pulses of both polarities are used for plasma generation.

In the embodiment the pulse rise time is short compared to the pulse period; however, surface plasmas can also be generated with sinusoidal waveforms. As the air reaction to the pulses is much slower it is not anticipated that significant differences to the results would be obtained. Typical energy dissipations per centimetre of electrode length per pulse at 4 kV are approximately 30 µJ. There can be differences between positive and negative polarities but this is an approximate figure. It is estimated that air velocities of >1 $ms^{-1}$ can be generated within a few millimetres of the first and second electrodes 7 and 9 and close to the surface of the dielectric layer 15.

Of course, variations to the specific embodiment described above are possible without departing from the scope of the invention.

Figure 5A:
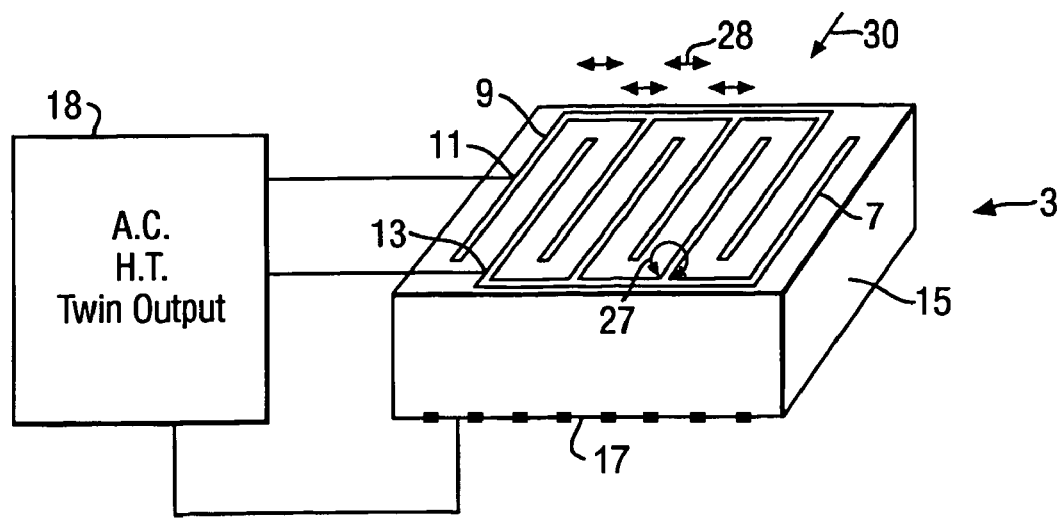
FIG. 5A is a schematic diagram of the apparatus for generating a plasma with elongate third electrodes.
Figure 5B:
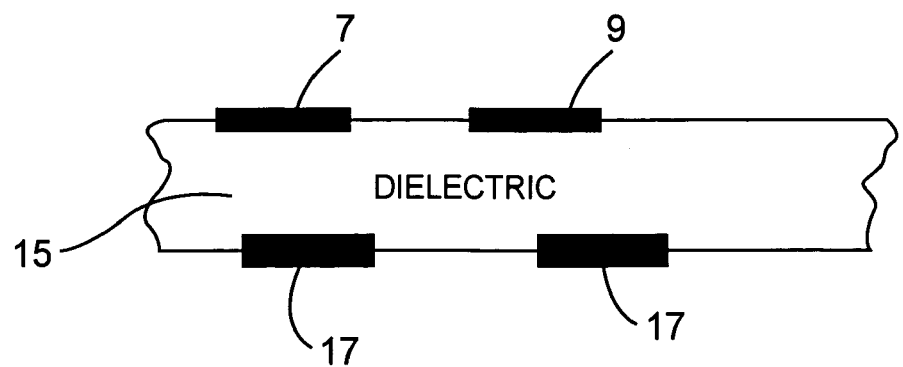
FIG. 5B is a cross-section of a portion of FIG. 5A.

For example, whilst a planar sheet electrode 16 provided on the opposite side of the dielectric layer 15 to the first and second electrodes 7 and 9 is described above, the following arrangement could be employed. A third electrode comprised of a plurality of electrically connected elongate elements 17 could be provided as shown in FIGS. 5A and 5B. Advantageously, the third electrode elements 17 may be laterally offset with respect to the first and second electrodes 7 and 9 rather than being positioned directly below the first and second electrodes 7 and 9. Where the lateral offset is small, the plasma generated is generally confined to one side of each of the first and second electrodes 7 and 9. Heating and expansion of the air will generally be in a single direction because the plasma is generated to only one side of the first and second electrodes 7 and 9 in this arrangement. In this embodiment, if the aircraft wing, or the structure to which the electrode assembly 3 is attached, is of metal or other electrically conductive material, an insulator should be provided between the third electrode and conductive structure.

The plasma generating apparatus may be controlled so that it does not operate during take-off and landing of the aircraft, and generally at low altitudes. It may be advantageous not to operate the plasma generating apparatus in these situations for safety reasons—operation may interfere with electronic apparatus in the aircraft and also on the ground, at the airport.

The invention claimed is:

1. Apparatus for influencing fluid flow over a surface, the apparatus comprising:
   a plasma generator;
   sheet dielectric having first and second sides;
   first and second electrodes on said first side of said sheet dielectric;
   a third electrode on said second side of said sheet dielectric, the first and second sides of said sheet dielectric being generally opposed, wherein:
   each of the first and second electrodes comprise a plurality of electrically-connected interdigitated elongate elements; the first and second electrodes, responsive to said plasma generator, are independently controllable and cause a change in direction of the flow of the fluid over the surface, wherein the plasma generator drives the first and second electrodes alternately.

2. Apparatus according to claim 1, wherein the first and second electrodes are in substantially parallel alignment.

3. Apparatus according to claim 2, wherein the first and second electrodes extend generally parallel to the usual direction of motion of the surface in use.

4. Apparatus according to claim 1, wherein the third electrode is planar.

5. Apparatus according to claim 1, wherein the third electrode comprises a plurality of electrically connected elongate elements.

6. Apparatus according to claim 5, wherein the elongate elements of the first, second and third electrodes are in a substantially parallel juxtaposed alignment when viewed facing the first side of the dielectric.

7. Apparatus according to claim 6, wherein the elongate elements of the first, second and third electrodes extend generally parallel to the usual direction of motion of the surface in use.

8. Apparatus according to claim 6, wherein the elongate elements of the third electrode are laterally offset from the elongate elements of the first and second electrodes.

9. An aircraft aerodynamic surface including apparatus according to claim 1, wherein the plasma generator is operable to cause a change in direction of the flow of the fluid over the surface.

10. An aircraft including apparatus according to claim 1, wherein the plasma generator is operable to cause a change in direction of the flow of the fluid over the surface.

11. A method of operating the apparatus of claim 1 thereby to influence fluid flow over a surface, comprising the step of driving the first and second electrodes alternately thereby to generate a plasma and, in turn, to cause a change in direction of the flow of the fluid over the surface.

* * * * *